United States Patent
Varney

(10) Patent No.: US 10,024,175 B2
(45) Date of Patent: Jul. 17, 2018

(54) COOLING HOLES MANUFACTURED WITH EBC IN PLACE

(71) Applicant: Rolls-Royce Corporation, Indianapolis, IN (US)

(72) Inventor: Bruce Edward Varney, Greenwood, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 425 days.

(21) Appl. No.: 14/722,091

(22) Filed: May 26, 2015

(65) Prior Publication Data

US 2016/0348511 A1 Dec. 1, 2016

(51) Int. Cl.
| | | |
|---|---|---|
| *F01D 5/18* | (2006.01) |
| *F01D 5/28* | (2006.01) |
| *C04B 35/78* | (2006.01) |
| *B28B 7/34* | (2006.01) |
| *B28B 23/00* | (2006.01) |

(52) U.S. Cl.
CPC .............. *F01D 5/288* (2013.01); *B28B 7/342* (2013.01); *B28B 23/0006* (2013.01); *F01D 5/187* (2013.01); *F01D 5/282* (2013.01); *F05D 2230/30* (2013.01); *F05D 2230/90* (2013.01); *F05D 2300/15* (2013.01); *F05D 2300/2261* (2013.01); *F05D 2300/514* (2013.01); *F05D 2300/6033* (2013.01); *F05D 2300/614* (2013.01)

(58) Field of Classification Search
None
See application file for complete search history.

(56) References Cited

U.S. PATENT DOCUMENTS

| | | | |
|---|---|---|---|
| 4,913,953 A | 4/1990 | Prewo et al. |
| 5,344,690 A | 9/1994 | White et al. |
| 5,866,244 A | 2/1999 | Jessen |
| 5,916,510 A | 6/1999 | Jessen |
| 5,961,661 A | 10/1999 | Jessen |
| 6,325,593 B1 | 12/2001 | Darkins, Jr. et al. |
| 6,441,341 B1 | 8/2002 | Steibel et al. |
| 6,746,755 B2 | 6/2004 | Morrison et al. |
| 7,153,464 B2 | 12/2006 | Millard et al. |
| 7,754,126 B2 | 7/2010 | Subramanian et al. |
| 8,057,880 B2 | 11/2011 | Petervary et al. |
| 9,797,263 B2* | 10/2017 | Varney .................. F01D 5/284 |
| 2003/0223861 A1* | 12/2003 | Morrison ............... F01D 5/189 415/115 |

(Continued)

*Primary Examiner* — Shamim Ahmed
(74) *Attorney, Agent, or Firm* — Brinks Gilson & Lione

(57) ABSTRACT

A method for forming a hole in a ceramic matrix composite (CMC) component may be provided. A sacrificial fiber having an environmental barrier coating on an outer surface thereof may be inserted into a porous ceramic preform that includes ceramic fibers. The ceramic preform may be formed into a ceramic matrix composite body. The sacrificial fiber may be removed from the ceramic matrix composite body, the environmental barrier coating of the sacrificial fiber defining an opening in the ceramic matrix composite body. A ceramic matrix composite component may be provided. The ceramic matrix composite component may include an environmental barrier coating of a sacrificial fiber, where the environmental barrier coating forms a lining of a hole passing partly or entirely through a thickness of the ceramic matrix composite body.

19 Claims, 4 Drawing Sheets

(56) References Cited

U.S. PATENT DOCUMENTS

| | | |
|---|---|---|
| 2007/0196693 A1 | 8/2007 | Steibel et al. |
| 2011/0158820 A1 | 6/2011 | Chamberlain et al. |
| 2014/0120308 A1 | 5/2014 | Lin et al. |
| 2014/0271153 A1 | 9/2014 | Uskert et al. |
| 2016/0047549 A1 | 2/2016 | Landwehr et al. |
| 2016/0115086 A1* | 4/2016 | Tuertscher ............ C04B 35/573 264/29.1 |

* cited by examiner

COOLING HOLES MANUFACTURED WITH EBC IN PLACE

TECHNICAL FIELD

This disclosure relates to ceramic matrix composite (CMC) components and, in particular, to opening or holes in CMC components.

BACKGROUND

Present approaches to forming holes in ceramic matrix composite components for use in high temperature and high pressure environments suffer from a variety of drawbacks, limitations, and disadvantages. There is a need for the inventive ceramic matrix composite components, apparatuses, systems and methods disclosed herein.

BRIEF SUMMARY

A method for forming a hole in a ceramic matrix composite (CMC) component may be provided. A sacrificial fiber having an environmental barrier coating on an outer surface thereof may be inserted into a porous ceramic preform that includes ceramic fibers. The ceramic preform may be formed into a ceramic matrix composite body. The sacrificial fiber may be removed from the ceramic matrix composite body, the environmental barrier coating of the sacrificial fiber remaining and defining an opening in the ceramic matrix composite body.

A ceramic matrix composite component may be provided. The ceramic matrix composite component may include an environmental barrier coating from a sacrificial fiber, where the environmental barrier coating forms a lining of a hole passing partly or entirely through a thickness of the ceramic matrix composite body.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Ceramic matrix composite (CMC) components in a hot section of a gas turbine engine may be un-cooled or cooled by forcing air into an inner portion of a CMC component when an outer portion of the CMC component is subject to high heat. Including relatively small holes in the CMC component may increase the cooling effectiveness, facilitating use of the CMC component in combustion liners, turbine blades, turbine vanes, or other parts subjected to intense heat and/or pressure.

However, machining cooling holes in the CMC component may result in cut fibers of the CMC component and expose a surface which is unprotected by an environmental barrier coating. The cut fibers and/or lack of the environmental barrier coating may result in a weakened portion of the CMC component, subject to environmental attacks, such as oxidation. Moreover, the weakened portion of the CMC component may be right where stresses are the highest due to stress concentrations on or around the hole.

While methods for forming the cooling holes in situ may address the issue of cut fibers, the methods may still leave an unprotected surface in the hole. In addition, applying an environmental barrier coating to the CMC component having holes formed in situ may inadvertently plug the holes with the material of the environmental barrier coating.

In one example to address these problems, a sacrificial fiber may be introduced in a component fiber layup or weave prior to final processing of the component. An environmental barrier coating may be applied to the sacrificial fiber prior to introduction into the component fiber layup or weave. The sacrificial fiber may be of a material that may be removed via chemical etching, burnout, or any other mechanism for removing the sacrificial fiber that leaves the environmental barrier coating of the sacrificial fiber in the CMC component. The sacrificial fiber may be removed after component forming, for example, and prior to, during or after component machining.

The result may be a cooling hole through the CMC component which does not compromise the integrity of the ceramic fibers, which flow around the hole instead of being cut at the hole. In addition, the cooling hole may have an environmental barrier coating to limit an environmental attack on material adjacent to the hole.

Figure 1:
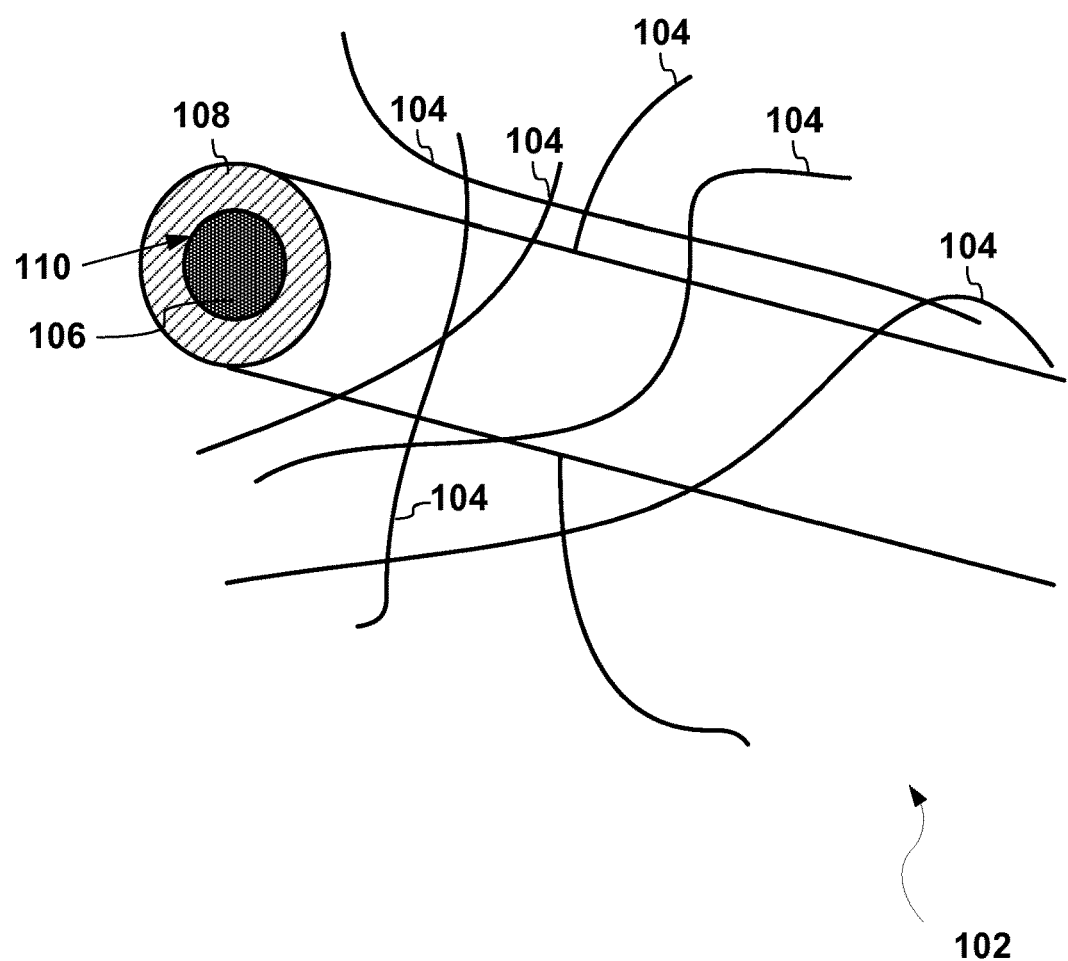
FIG. 1 illustrates an example of a ceramic preform that includes ceramic fibers and a sacrificial fiber.

FIG. 1 illustrates an example of a ceramic preform 102 that includes ceramic fibers 104 and a sacrificial fiber 106, where the sacrificial fiber 106 has an environmental barrier coating 108 on an outer surface 110 of the sacrificial fiber 106.

The ceramic preform 102 may be an arrangement of the ceramic fibers 104. The arrangement may be fixed in a desired shape. The ceramic preform 102 is porous. Examples of the ceramic preform 102 may include a three-dimensional weave of the ceramic fibers 104. Alternatively or in addition, the ceramic preform 102 may include a two-dimensional weave of the ceramic fibers 104. The ceramic preform 102 may include multiple layers of two-dimensional weave of the ceramic fibers 104. Alternatively or in addition, the ceramic preform 102 may include a fiber layup, such as a unidirectional layup.

In some examples, each of the ceramic fibers 104 may be a bundle and/or a tow of ceramic fibers. The fibers in each bundle or tow may be braided or otherwise arranged.

The ceramic fibers 104 may comprise a material that is stable at temperatures above 1000 degrees Celsius. Examples of the ceramic fibers 104 may include fibers of alumina, mullite, silicon carbide, zirconia or carbon. The ceramic fibers 104 may not be organic, metallic or glass fibers.

The sacrificial fiber 106 comprises a material that may be removed after the preform 102 is formed into a CMC component, leaving the environmental barrier coating 108 embedded in the CMC component. Examples of the sacrificial fiber 106 may include a fiber of carbon, carbon precursors, alumina, mullite, or any type of organic fiber such as KEVLAR® brand aramid fiber (KEVLAR is a registered trademark of du Pont de Nemours and Company of Delaware).

The environmental barrier coating 108 may be a coating that provides a barrier against environmental attack. The CMC component or any portion thereof, such as the ceramic fibers 104, the matrix of the CMC component, and/or a fiber interface coating applied to the ceramic fibers 104, may be subject to environmental attack. The environmental attack may be from oxygen, water vapor, or any other compound that may degrade the integrity or performance of the CMC component. The environmental barrier coating 108 may be based on a silicate, such as a rare earth silicate or other silicate. The environmental barrier coating 108 may comprise, for example a Ytterbium silicate, a Yttrium silicate, barium strontium aluminosilicate, and/or mullite. The environmental coating 108 may be applied to the sacrificial fiber 106 via plasma spray, PVD, CVD, slurry process, any or other suitable process.

The outer surface 110 of the sacrificial fiber 106 to which the environmental barrier coating 108 is applied may extend axially along the sacrificial fiber 106.

The sacrificial fiber 106 having the environmental barrier coating 108 on the outer surface 110 thereof may be inserted into the ceramic preform 102. Inserting the sacrificial fiber 106 may include arranging the ceramic fibers 104 around the sacrificial fiber 106. Alternatively or in addition, inserting the sacrificial fiber 106 may include inserting the sacrificial fiber 106 into a prearrangement of the ceramic fibers 104. Alternatively or in addition, inserting the sacrificial fiber 106 may include arranging the sacrificial fiber 106 together with the ceramic fibers 104 into the preform 102. For example, the sacrificial fiber 106 may be woven together with the ceramic fibers 104.

Figure 2:
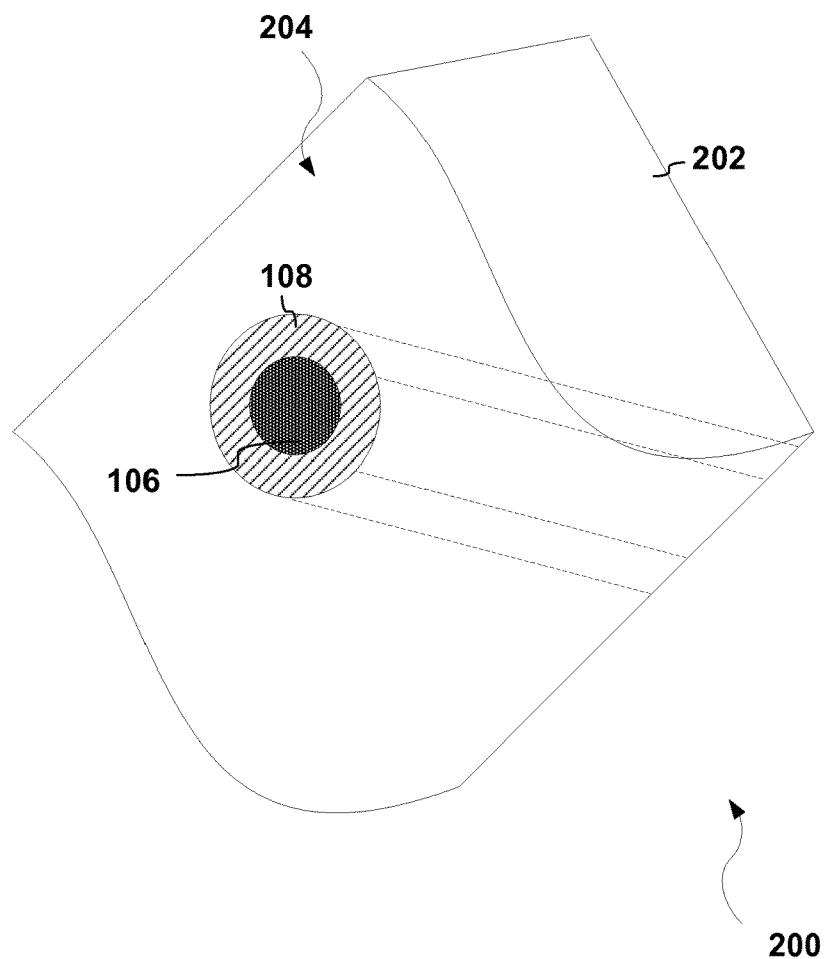
FIG. 2 illustrates an example of a ceramic matrix composite body formed from a ceramic preform.

The ceramic preform 102, comprising the ceramic fibers 104 and the sacrificial fiber 106, may be formed into a ceramic matrix composite body. FIG. 2 illustrates an example of a CMC component 200 that comprises a ceramic matrix composite body 202 formed from the ceramic preform 102.

The CMC component 200 may be any component in which one or more holes may be desired. For example, the CMC component 200 may be any component in which one or more holes are desired for fluid flow. Examples of the CMC component 200 may include, but are not limited to, any component of a gas turbine engine, such as an airfoil, a turbine blade, a vane, an endwall, and/or a seal segment.

The ceramic matrix composite body 202 may be the CMC component 200 in which a hole is to be formed. Alternatively, the ceramic matrix composite body 202 may be a component of the CMC component 200 in which a hole is to be formed. The ceramic matrix composite body 202 may comprise, for example, a silicon carbide ceramic matrix composite. The ceramic matrix composite body 202 may have any shape or form, not just the shape illustrated in FIG. 2.

Forming the ceramic matrix composite body 202 from the ceramic preform 102 may include infiltrating a molten metal or alloy (for example, a silicon metal or alloy) into the ceramic preform 102. The silicon metal or alloy may fill gaps between the ceramic fibers 104 and the sacrificial fiber 106 having the environmental barrier coating 108. The silicon metal or alloy may also react with a reactive element source present in the ceramic preform 102 to form additional silicon based ceramic matrix material. In some examples, a chemical vapor infiltration coating may be applied to the ceramic preform 102 prior to the melt infiltration to stiffen the ceramic fibers 104. Alternatively or in addition, forming the ceramic matrix composite body 202 from the ceramic preform 102 may include chemical vapor infiltrating the ceramic preform 102 instead of melt infiltrating a material into the ceramic preform 102.

As described above, the sacrificial fiber 106 may be inserted into the preform 102 prior to forming the ceramic matrix composite body 202. Accordingly, the environmental barrier coating 108 of the sacrificial fiber 106 and the sacrificial fiber 106 may be included in the ceramic matrix composite body 202 as illustrated in FIG. 2.

The sacrificial fiber 106 having the environmental barrier coating 108 may be embedded in the ceramic matrix composite body 202 at any angle with respect to an outer surface 204 of the ceramic matrix composite body 202. The sacrificial fiber 106 may extend partially or completely through the ceramic matrix composite body 202. In some examples, the sacrificial fiber 106 may curve or even wind through the ceramic matrix composite body 202.

If the sacrificial fiber 106 and the environmental barrier coating 108 extend outside of the ceramic matrix composite body 202, then the portion that extends outside of the ceramic matrix composite body 202 may be removed in some examples. The portion that extends outside of the ceramic matrix composite body 202 may be machined off or otherwise removed.

Figure 3:
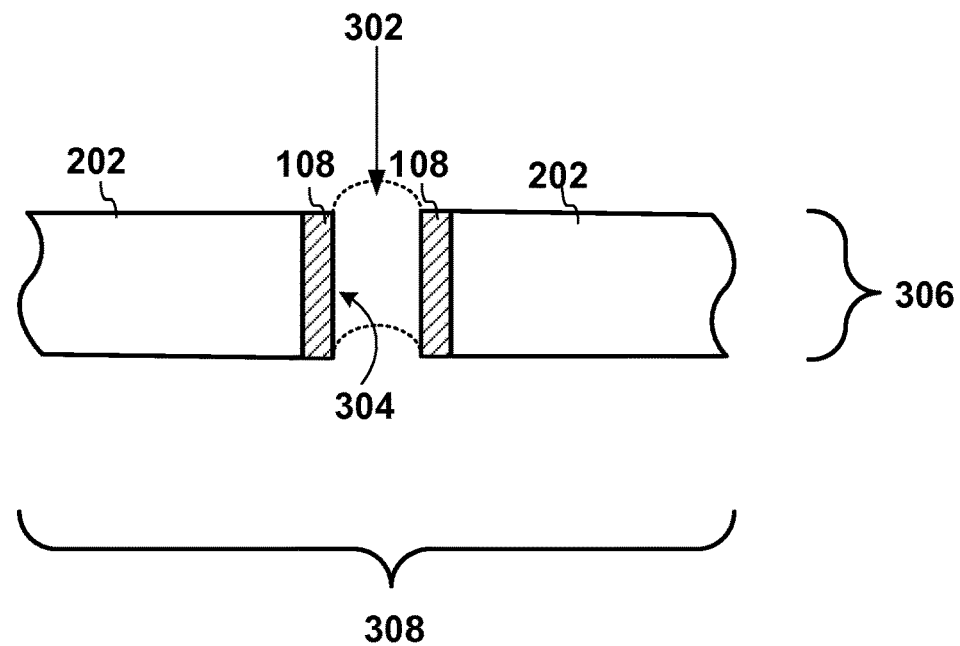
FIG. 3 illustrates a cross-sectional view of a ceramic matrix composite body where an environmental barrier coating of a sacrificial fiber remains in the ceramic matrix composite body after the sacrificial fiber is removed.

The sacrificial fiber 106 may be removed from the ceramic matrix composite body 202, leaving the environmental barrier coating 108 behind. FIG. 3 illustrates a cross-sectional view of the ceramic matrix composite body 202 where the environmental barrier coating 108 of the sacrificial fiber 106 remains in ceramic matrix composite body 202 after the sacrificial fiber 106 is removed. Removal of the sacrificial fiber 106 may be achieved via oxidation, chemical removal, mechanical removal and/or any other means of removal.

The environmental barrier coating 108 of the removed sacrificial fiber defines an opening or a hole 302 in the ceramic matrix composite body 202. The environmental barrier coating 108 may form a lining of the hole 302. In other words, an inner surface 304 of the environmental barrier coating 108 may define the hole 302. The inner surface 304 of the environmental barrier coating 108 faced the outer surface 110 of the sacrificial fiber 106 before the sacrificial fiber 106 was removed.

Removing the sacrificial fiber 106 leaving the environmental barrier coating 108 in place may be performed using any suitable mechanism. For example, the sacrificial fiber 106 may be removed by burning out the sacrificial fiber 106, by chemical etching or leaching of the sacrificial fiber 106, by machining out the sacrificial fiber 106, or by any other mechanism that removes the sacrificial fiber 106 but that leaves at least a portion of the environmental barrier coating 108 of the removed sacrificial fiber. The portion of the environmental barrier coating 108 of the sacrificial fiber remaining in the ceramic matrix composite body 202 may be a hollow tube.

The sacrificial fiber 106 may be removed after forming the ceramic matrix composite body 202. For example, the sacrificial fiber 106 may be removed prior to, during, or after machining the ceramic matrix composite body 202 or the CMC component.

An additional environmental barrier coating may be applied to the ceramic matrix composite body 202 before the sacrificial fiber 106 is removed. Alternatively, an additional environmental barrier coating may not be applied to the ceramic matrix composite body 202.

When completed, the ceramic matrix composite (CMC) component may include and/or be the ceramic matrix composite body 202. The ceramic matrix composite body 202 may include the environmental barrier coating 108 from the sacrificial fiber 106, where the environmental barrier coating 108 forms a lining of the hole 302 passing partly or entirely through a thickness 306 of the ceramic matrix composite body 202.

The inner surface 304 of the environmental barrier coating 108 may form a wall surrounding the hole 302. No fibers of the ceramic matrix composite body 202 are cut at the wall of the opening. The thickness of the environmental barrier coating 108 that remains in the ceramic matrix composite body 202 may be in a range of about 0.001 inches to about 0.050 inches.

The opening or the hole 302 in the ceramic matrix composite body 202 may be in a range of about 0.005 inches to about 0.050 inches in diameter. In some examples, the diameter of the hole 302 or the opening may be outside of the range of about 0.005 inches to about 0.050 inches. The hole 302 may by cylindrical or any other regular or irregular shape.

The opening or the hole 302 may be a passage for a thermal fluid. For example, the hole 302 may be a passage for air.

If the ceramic matrix composite body 202 or the CMC component 200 is an airfoil, such as a turbine blade or vane, the ceramic matrix composite body 202 may be subject to high temperatures. Subjecting one portion of a span 308 ceramic matrix composite body 202 to high temperatures may cause a temperature gradient across the span 308 of the ceramic matrix composite body 202. The temperature gradient may cause damage to the ceramic matrix composite body 202 that is sometimes catastrophic. The opening or the hole 302 may be a cooling hole. For example, air may be forced through the hole 302 cooling the ceramic matrix composite body 202 around the hole 302. Therefore, forcing air through the hole 302 may reduce the temperature gradient across the span 308 of the ceramic matrix composite body 202.

The examples illustrated in FIGS. 1-3 include just one sacrificial fiber or hole. However, the same technique may be used to form two or more holes in the ceramic matrix composite body 202. For example, multiple sacrificial fibers, each with an environmental barrier coating, may be inserted into the ceramic preform 102. The sacrificial fibers may be removed after the ceramic matrix composite body 202 is formed, leaving the environmental barrier coatings in place in the ceramic matrix composite body 202. Each one of the environmental barrier coatings left behind forms a corresponding hole.

Figure 4:
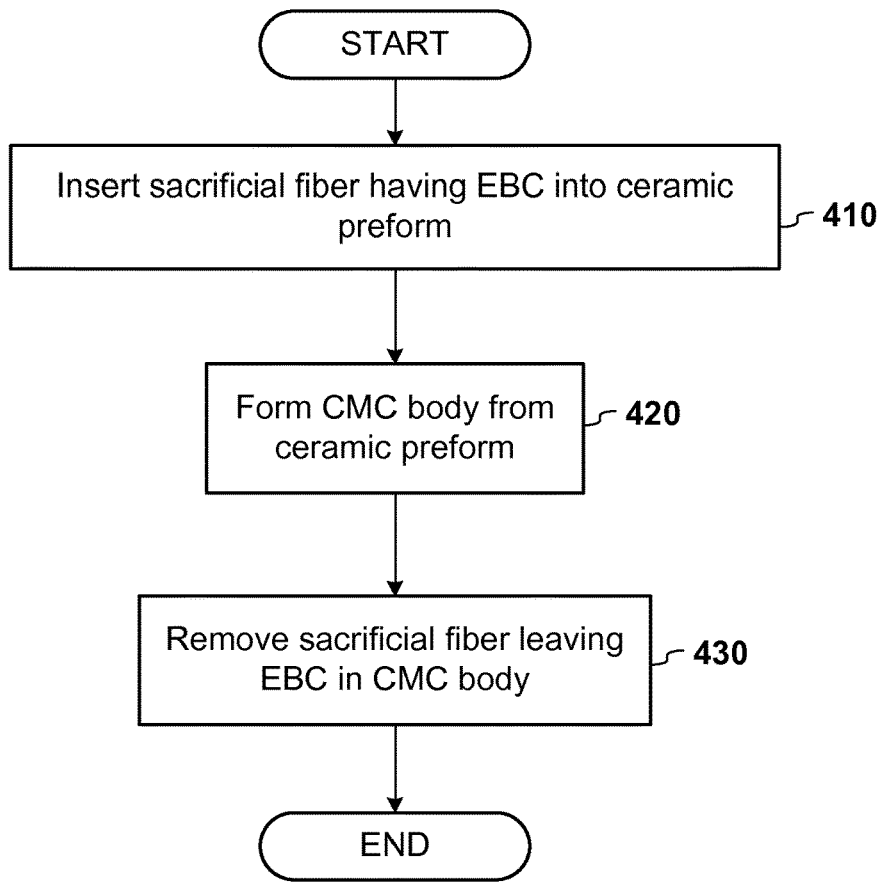
FIG. 4 illustrates a flow diagram of an example method to form a hole in a ceramic matrix composite (CMC) component.

FIG. 4 illustrates a flow diagram of an example method to form a hole in a ceramic matrix composite (CMC) component. The method may include additional, different, or fewer operations than illustrated in FIG. 4. The operations may be executed in a different order than illustrated in FIG. 4.

The sacrificial fiber 106 having the environmental barrier coating 108 may be inserted (410) into the porous ceramic preform 102 comprising the ceramic fibers 104.

The ceramic matrix composite component may be formed (420) from the porous ceramic preform 102. For example, the ceramic matrix composite component may be formed (420) from the ceramic preform 102 by melt infiltrating the porous ceramic preform 102.

The sacrificial fiber 106 may be removed (430) from the ceramic matrix composite component, the environmental barrier coating 108 of the sacrificial fiber 106 defining an opening in the ceramic matrix composite component. Operations may end, for example, by machining the ceramic matrix composite component to a final shape.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

Furthermore, the advantages described above are not necessarily the only advantages, and it is not necessarily expected that all of the described advantages will be achieved with every embodiment.

What is claimed is:

1. A method for forming a hole in a ceramic matrix composite (CMC) component, the method comprising:
   inserting a sacrificial fiber having an environmental barrier coating on an outer surface thereof into a porous ceramic preform comprising a plurality of ceramic fibers;
   forming the porous ceramic preform into a ceramic matrix composite body; and
   removing the sacrificial fiber from the ceramic matrix composite body, the environmental barrier coating of the sacrificial fiber remaining and defining an opening in the ceramic matrix composite body.

2. The method of claim 1 wherein the porous ceramic preform comprises a three-dimensional weave, and wherein inserting the sacrificial fiber comprises inserting the sacrificial fiber into the three-dimensional weave.

3. The method of claim 1 wherein the porous ceramic preform comprises a two-dimensional weave, and wherein inserting the sacrificial fiber comprises inserting the sacrificial fiber into the two-dimensional weave.

4. The method of claim 1 wherein the porous ceramic preform comprises a unidirectional layup, and wherein inserting the sacrificial fiber comprises inserting the sacrificial fiber into the unidirectional layup.

5. The method of claim 1 wherein the ceramic fibers in the porous ceramic preform are braided.

6. The method of claim 1 wherein forming the ceramic matrix composite body comprises infiltrating a molten metal or alloy into the porous ceramic preform.

7. The method of claim 1 wherein forming the ceramic matrix composite body comprises chemical vapor infiltrating the porous ceramic preform.

8. The method of claim 1 further comprising applying a chemical vapor infiltration coating to the ceramic fibers of the porous ceramic preform prior to forming the porous ceramic preform into the ceramic matrix composite body.

9. The method of claim 1 wherein the sacrificial fiber is inserted into the porous ceramic preform prior to forming the porous ceramic preform into the ceramic matrix composite body.

10. The method of claim 1 wherein the sacrificial fiber is removed after the ceramic matrix composite body is formed.

11. The method of claim 1 wherein removing the sacrificial fiber comprises removing the sacrificial fiber by machining.

12. The method of claim 1 wherein removing the sacrificial fiber comprises removing the sacrificial fiber by chemical etching.

13. The method of claim 1 wherein removing the sacrificial fiber comprises removing the sacrificial fiber by burning.

14. The method of claim 1, wherein the ceramic matrix composite body comprises silicon carbide.

15. The method of claim 1, wherein no fibers of the ceramic matrix composite body are cut at the environmental barrier coating of the opening.

16. The method of claim 1 further comprising including the ceramic matrix composite body in an airfoil.

17. The method of claim 1, wherein a diameter of the opening in the ceramic matrix composite body is in a range of about 0.005 inches to about 0.050 inches.

18. The method of claim 1, wherein a thickness of the environmental barrier coating of the opening is in the range of about 0.001 inches to about 0.050 inches.

19. The method of claim 1, wherein the opening is a passage for a thermal fluid.

\* \* \* \* \*